Sept. 15, 1970  G. A. RIGOLLOT  3,528,582
FLUID-TIGHT METAL TANK
Filed Aug. 29, 1968  2 Sheets-Sheet 1
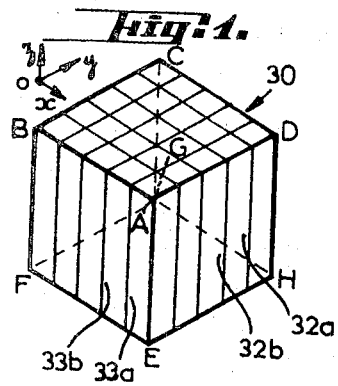
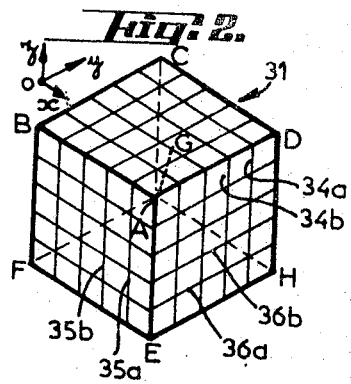
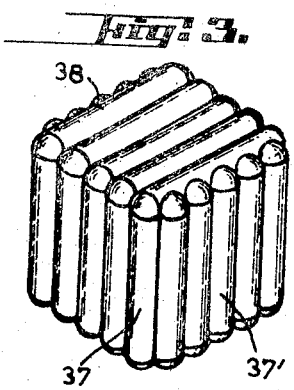
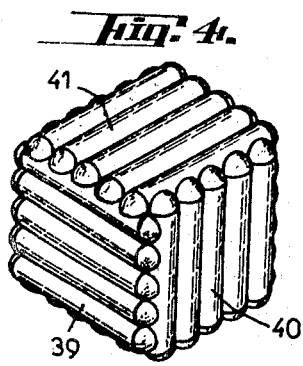
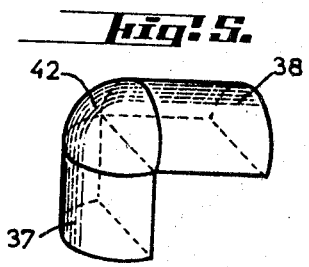
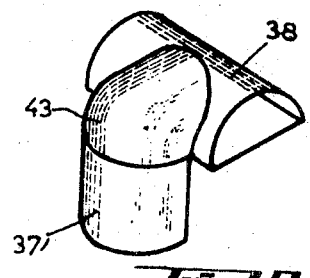
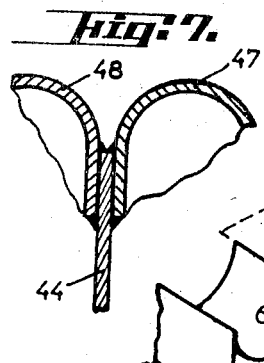
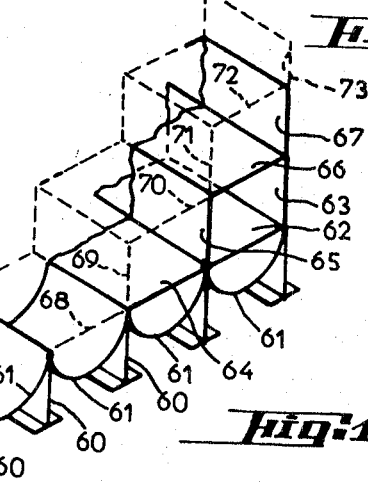
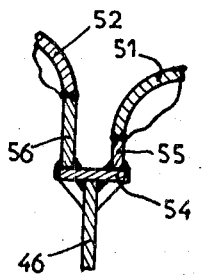
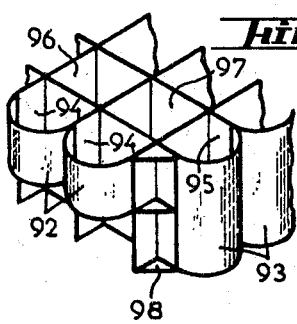
INVENTOR
GEORGES ALFRED RIGOLLOT
BY Steinberg & Blake
attys

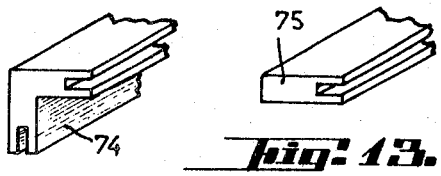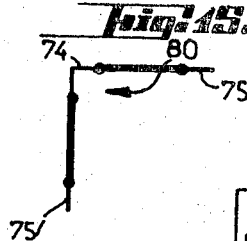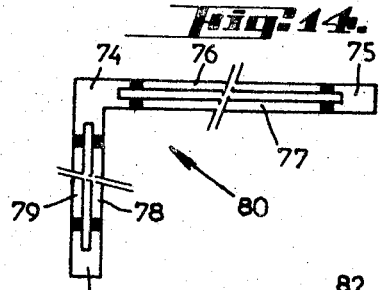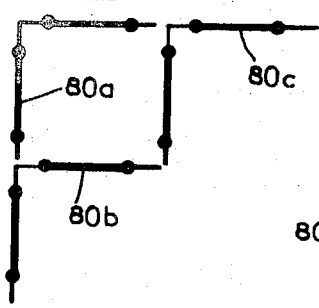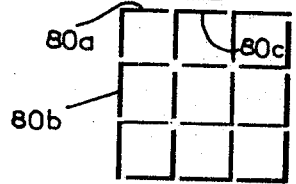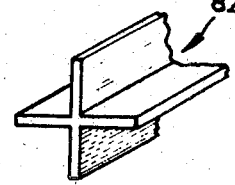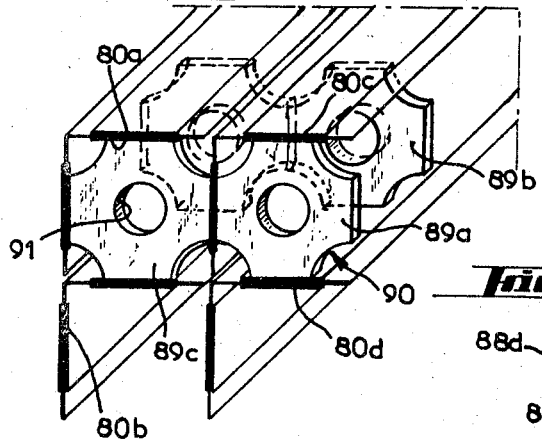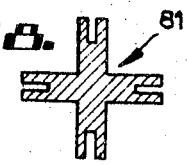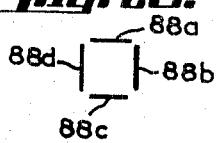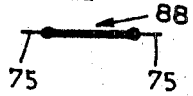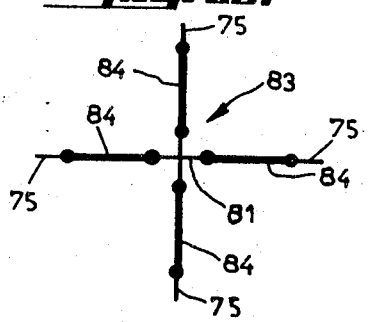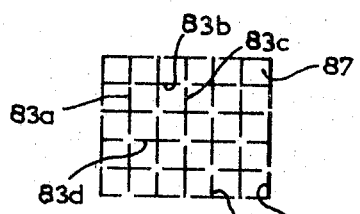

United States Patent Office 3,528,582
Patented Sept. 15, 1970

3,528,582
FLUID-TIGHT METAL TANK
Georges Alfred Rigollot, 66 Avenue Henri Martin,
Paris XVI°, France
Filed Aug. 29, 1968, Ser. No. 756,257
Claims priority, application France, Aug. 31, 1967,
119,653; Aug. 2, 1968, 161,829
Int. Cl. F21j
U.S. Cl. 220—3                                    8 Claims

ABSTRACT OF THE DISCLOSURE

Fluid-tight metal tank for fluid under pressure, of the type including a lobate outer shell and a reinforcing framework made of plates welded to the junction edges of said lobes, wherein said plates appertain to at least two orthogonal groups of parallel plates and define a rectangular alveolate parallelepipedon block with edges which are either parallel to the lines of intersection of said plates or perpendicular to said plates, and said outer shell is formed by cylindric lobes welded on the faces of said block, the generatrices of said lobes being directed parallel to at least two orthogonal edges of said block.

---

The present invention essentially relates to a fluid-tight metal tank capable of containing especially a fluid under pressure, such tank being of the type including a lobate outer shell as well as stiffening and reinforcing plates welded to the junction edges of said lobes.

In this application has especially been described the structure of a tank with a lobate outer shell including a reinforcement, a framework of welded orthogonal plates being tensioned by the pressure exerted by the compressed gas within the tank.

In prior constructions are also known tanks of this type, including a lobate outer shell and a stiffening reinforcement welded to the edges connecting said lobes so as to prevent a burst of said tank under the action of the internal pressure to which it may be subjected. In all these tanks, the lobes are cylindric, parallel and for example arranged vertically.

The invention aims at providing an improved metal tank with a lobate outer shell, wherein said stiffening plates form a network of at least two orthogonal groups of parallel plates defining a rectangular parallelepipedon block having edges parallel to the intersection lines of said plates, i.e. perpendicular to said plates, and on the faces of which are welded cylindric lobes forming the outer shell, the generatrices of said lobes being directed parallel with at least two orthogonal edges of said block.

Under these conditions, it will be appreciated that the whole outer shell may be made from cylindric lobes and that, in addition, the various possible orientations of these lobes allow for a much more accommodating fluid distribution within the tank as compared with known prior structures.

According to the invention, the reinforcement formed by the framework of orthogonal plates may include two or three groups of plates, the three-group structure of the plates providing for a higher mechanical strength and making it besides possible to construct the outer shell with cylindric lobes the orientations of which may be selected on each face of the block to be parallel with any one of the three edges of the parallelepipedon.

The shell lobes are then connected along sphere quarters and/or cylinder intersections, in accordance with construction standards well known in boiler making.

The invention is especially well adapted to a construction with prefabricated elements which may be readily and rapidly assembled.

The invention will become more readily apparent from the following detailed description of some purely illustrative examples of embodiment, also schematized in the accompanying drawings wherein:

FIG. 1 is a perspective view showing a framework of two orthogonal groups of parallel plates forming a parallelepipedon stiffening reinforcement on which may be welded the lobate outer shell of the tank;

FIG. 2 shows a view similar to that of FIG. 1, relating to a reinforcement using three orthogonal groups of parallel plates;

FIGS. 3 and 4 illustrate lobate shell tanks constructed respectively on the reinforcement of FIG. 1 and on the reinforcement of FIG. 2;

FIGS. 5 and 6 detailedly show at a larger scale junctions between two secant lobes of the shell;

FIGS. 7, 8 and 9 illustrate three methods for welding lobes upon the stiffening reinforcement:

FIG. 10 shows how different lobes may cross on a same tank face including a reinforcement made of three orthogonal groups of parallel plates;

FIG. 11 illustrates a method for assembling a tank;

FIGS. 12 and 13 give perspective views of prefabricated elements which may be used to form a stiffening reinforcement;

FIG. 14 shows how the elements of FIGS. 12 and 13 may be used to form more important sub-assemblies intended for the construction of a tank reinforcement;

FIG. 15 shows in a schematic way the sub-assembly of FIG. 14;

FIGS. 16 and 17 show in a schematic way how the sub-assemblies of the type shown on FIGS. 14 and 15 may be used to form the reinforcement of a tank in accordance with this invention;

FIGS. 18 and 19 show alternative prefabricated elements to be used in a way similar to those of FIGS. 12 and 13;

FIG. 20 shows in a schematic way how the elements of FIGS. 18 and 19 may be used to form sub-assemblies of a type somewhat different from that of FIGS. 14 and 15;

FIG. 21 shows how the sub-assemblies of FIG. 20 may be used to form the reinforcement of a tank according to the invention;

FIG. 22 is a view similar to those of FIGS. 15 and 20, relating to another variant;

FIG. 23 shows in a schematic way how the elements of FIG. 22 may be used to form a tank reinforcement in accordance with this invention;

FIG. 24 shows how, according to the invention, a reinforcement including three orthogonal groups of welded parallel plates may be achieved;

FIG. 25 is a view similar to that of FIG. 10 but relating to a variant.

Referring first to FIGS. 1 and 2, a parallelopipedon block formed by two reinforcements, respective 30 and 31, has been represented. The reinforcement 30 comprises two orthogonal groups of parallel plates, 32 and 33, respectively, said plates being successively marked 32*a*, 32*b* . . . 33*a*, 33*b* . . . . The two groups of parallel plates 32 and 33 are made to cross and are welded following connection lines parallel to the edges A–E, B–F, C–G, D–H of the parallelepipedon.

In FIG. 2 may be seen that three orthogonal groups of parallel plates 34, 35 and 36 cross each other two by two following lines parallel to the various edges of the rectangular parallelepipedon.

FIG. 3 shows a lobate tank shell welded upon the reinforcement 30.

The shell includes, on the four vertical faces of the tank, vertical cylindric lobes 37, 37' as well as on the horizontal faces of the tank, horizontal cylindric lobes 38.

Taking into account the arrangement of the plate groups 32 and 33, it is obvious that cylindric lobes parallel to the direction Oz may be arranged on the vertical faces of the tank, while lobes parallel to the direction Ox and/or Oy may be secured on the horizontal faces of this tank.

FIG. 4 shows the embodiment of a lobate shell welded onto the reinforcement 31. When the latter is a reinforcement made of three orthogonal groups of parallel plates, it is obvious that the orientation of the cylindric lobes may be, on each face of the rectangular parallelepipedon formed by the reinforcement, directed selectively following Ox, Oy or Oz parallel to the edges of said parallelepipedon.

In FIGS. 5 and 6 has been shown how the connection of secant lobes such as 37 and 38 could be achieved by means of the sphere quarter 42, while the connection of secant lobes such as 37', 38 is performed by the intersection with cylinder 43.

FIGS. 7, 8 and 9 show, by way of example, three methods for welding, upon a reinforcing plate such as 44, 45 or 46, two adjacent lobes, respectively 47–48, 49–50 and 51–52. In the case of FIG. 8, an intermediate plate 53 is welded onto the reinforcing plate 45, while in the case of FIG. 9, sectional irons of unequal lengths 55 and 56 are welded on an intermediate section 54, itself welded on the reinforcing plate 46.

FIG. 10 shows how parallel adjacent cylindric lobes such as 58, intersecting other orthogonal lobes 59, may be welded on any face of a reinforcement 57 formed by three orthogonal groups of stiffening plates.

For readily constructing a tank in accordance with the invention, it is possible to use, as shown in FIG. 11, vertical bracing plates 60 forming parallel supporting stands. On stands 60 may be welded adjacent lobes 61 to form the bottom face of the outer shell. Afterwards may successively be constructed, stepwise, the reinforcement by assembling, for example in the given order, plates 62 and 63 suitably secured together by welding, then plates 64, 65, 66 and 67 likewise welded, then plates 68 to 73, etc.

In FIG. 11 is shown a reinforcement constructed of two groups of orthogonal plates, a horizontal plate being thus formed of butt welded elements 62, 64, 68, etc., and a vertical plate being likewise formed of butt welded elements 63, 67, 73, etc.

The reinforcement may advantageously be constructed of prefabricated elements. Thus, in FIGS. 12 through 17, plates such as 76 to 79 are welded, as shown on FIG. 14, on the prefabricated elements 74, 75 to form a sub-assembly 80 schematized on FIG. 15. Such a construction has the advantage that each element forming a reinforcing plate is effectively doubled, so that a breaking of for example plate 76 involves no dangerous effects as there is another parallel plate 77.

With sub-assemblies such as 80 exhibiting an L-shaped cross-section may thus be very readily achieved, as schematized on FIGS. 16 and 17, a reinforcement such as 30 (FIG. 1).

In the variant of FIGS. 18 through 20, cross-shaped elements 81 or 82 are used instead of the prefabricated elements 74, sub-assemblies such as 83 being then constructed to comprise, for example, one cross-shaped element 81, four rectilinear element 75 and plates 84, the latter being double if a cross-shaped element such as 81 is used, or single if a cross-shaped element such as 82 is involved.

FIG. 21 shows, from sub-assemblies such as 83: 83a, 83b, 83c, etc. how it is possible to construct a reinforcement with two orthogonal groups of parallel plates, by completing the framework or network by other elements, such as, for example, the T-shaped element 85, L-shaped element 86 and gallows-shaped element 87.

In FIGS. 22 and 23 has been schematized a method for constructing a reinforcement from rectilinear sub-assemblies 88 including, for example, two elements 75 to which are welded two plates such as 76 and 77 (FIG. 14) the joining of four sub-assemblies 88a to 88d forming a parallelepipedon-shaped reinforcement. For instance, the elements 62, 63, 64, etc. of FIG. 11 may be constructed of such sub-assemblies 88.

FIG. 24 shows how, from a reinforcement composed of two orthogonal groups of parallel plates, for example constructed from sub-assemblies such as 80, it is possible, by welding elements 89, marked 89a, 89b, etc. and having a rectangular shape with cut-out edges having rounded corner notches, to construct a reinforcing structure with three orthogonal groups of parallel plates. The notches 90 of elements 89 avoid in the structure an overlap of welding lines and give besides way to cables, pipes, etc. when the latter are required. Possibly, the elements 89 may be perforated in the way shown in 91.

FIG. 25 illustrates a variant of embodiment wherein lobes 92 and 93 of the outer shell are welded on external extensions 94, 95 of the plates 96, 97 composing the reinforcing framework. Such extensions, which may for example be one meter wide, increase at low costs the external circulation gangways. The angles of the tank may be reinforced in 98.

It is thus apparent that the reinforcing framework of the invention includes at least two orthogonal groups of intersecting parallel walls with each of these walls being composed of a series of plate structures, such as 80a, 80b, etc. indicated in FIGS. 16 and 17. Each of these plate structures of any one wall of one orthogonal group extends perpendicularly between a pair of walls of the other orthogonal group. Each of these plate structures has a pair of opposed side edge regions, such as the regions 74 and 75 shown in FIG. 14. Between these side edge regions each plate structure has a pair of spaced plates 76 and 77 welded to the side edge regions and defining between themselves an interior gap for each plate structure.

As is indicated in FIG. 24, the reinforcing framework also may include the plates 89a, 89b, etc., which are orthogonal to the groups of orthogonal walls and which are formed with the notched corners 90 and the central openings 91.

As the tank constructed according to the invention may be composed of prefabricated elements and sub-assemblies, it has a very simple structure. In addition, it is very reliable as the stresses, especially in the case of the reinforcement systems including three groups of orthogonal plates, are distributed over a great number of welded elements which co-operate and may possibly compensate for each other.

The tank may be used for example for the storage of a gas under pressure, the gas under pressure being used as means to accumulate energy. In this case, the tank may advantageously be buried. As the arrangement of the shell lobes may be varied, it is very easy, in this case, to obtain a temperature homogenizing or uniformity of the gas stored in the tank, or, on the contrary, a difference in such given area of the tank by arranging only suitably the gas inlets and outlets on such or such lobe of the outer shell.

The tank constructed in accordance with the invention may also be advantageously used as an integrated vessel in a nuclear reactor; as the tank is fluid-tight, the whole may even be immersed in a basin filled with water so as to secure a double thermal and biological protection and, by compensating the weight of the unit, it becomes possible to avail of a free play in the thermal expansions of the plant.

The tank may also be used to store, for example, compressed air intended for instance to supply a gas turbine with an instantaneous start up.

The tank may also be used to store, for example, a liquid fuel gas, so as to form in this case a buffer or complementary tank having a large capacity and a large safety coefficient for a reduced cost price.

While the invention has been illustrated and described in conjunction with a few referred embodiments thereof,

What is claimed is:

1. Fluid-tight tank for fluid under pressure comprising a lobate outer shell, including lobes having inwardly directed junction edges and a reinforcing framework made of plates welded to the junction edges of said lobes, said plates forming at least two orthogonal groups of parallel plates and defining a rectangular alveolate parallelepipedon block, each of said goups of parallel plates being parallel to a pair of mutually opposed faces of said rectangular parallepipedon, said outer shell being formed by cylindric lobes welded on the faces of said block along generatrices of said lobes on free edges of said plates, the generatrices of said lobes being parallel to at least two orthogonal edges of said rectangular parallelepipedon, said plates which constitute said framework being formed by assemblies welded end to end in alignment, each assembly comprising elongated elements and two parallel, spaced sheets defining a cavity between themselves welded at their edges side by side to said elongated elements, the thickness of said latter elements being substantially equal to the sum of the thicknesses of said sheets and of said gap.

2. Fluid-tight tank according to claim 1 wherein said elongated elements have substantially a rectangular cross-section and are each formed along an edge with a central groove forming an extension of said gap.

3. Fluid-tight tank according to claim 2 wherein said elongated elements are of a substantially L cross-section and terminate in edges each formed with said groove.

4. Fluid-tight tank according to claim 3 and including a third group of parallel plates orthogonal to the two other groups and formed by substantially rectangular plate-elements each formed with a central opening and having cut-out edges, welded to four adjacent plates of the two other groups.

5. Fluid-tight tank for fluid under pressure comprising a lobate outer shell including lobes having inwardly directed junction edges and a reinforcing framework made of plates welded to the junction edges of said lobes, said plates forming two orthogonal groups of parallel plates and defining a rectangular alveolate parallelepipedon block, each of said groups of parallel plates being parallel to a pair of mutually opposed faces of said rectangular parallelepipedon, said outer shell being formed by cylindric lobes welded on the faces of said block along generatrices of said lobes on free edges of said plates, the generatrices of said lobes being parallel to at least two orthogonal edges of said rectangular parallelepipedon, said two groups of parallel plates which constitute said framework being formed by assemblies welded end to end in alignment and said framework including a third group of parallel plates which is orthogonal to the two other groups, said plates of said third group being substantially rectangular plate-elements each formed with a central opening and having cut-out corners welded to four adjacent plates of the two other groups.

6. In an interior reinforcing framework of a fluid-tight tank, a plurality of parallel intersecting walls forming at least two orthogonal groups of walls, each wall being made up of a series of plate structures with each plate structure of any wall of one group extending perpendicularly between a pair of parallel walls of the other group, each plate structure including a pair of opposed elongated side edge members and a pair of mutually spaced parallel plates situated between and welded to said side edge members and defining between themselves an interior cavity for each plate structure.

7. The combination of claim 6 and wherein each plate structure has one side edge member integral with a side edge member of an adjoining perpendicular plate structure, and the integral side edge members of the latter adjoining plate structures forming an element of L-shaped cross-section.

8. The combination of claim 6 and wherein a plurality of parallel plates are orthogonal to the pairs of orthogonal wall groups with each of the latter plates being surrounded by and welded to four of said plate structures, and each of the latter plates being formed with corner notches providing spaces between said plates and plate structures.

References Cited

UNITED STATES PATENTS

| | | | |
|---|---|---|---|
| 1,616,008 | 2/1927 | Stout. | |
| 1,864,931 | 6/1932 | Pritchard | 220—1 |
| 1,911,058 | 5/1933 | Bushnell. | |
| 2,341,044 | 2/1944 | Jackson et al. | 220—3 |
| 2,516,100 | 7/1950 | Boardman | 220—1 |
| 2,668,634 | 2/1954 | Arne | 220—18 X |
| 2,673,001 | 3/1954 | Ulm et al. | 220—1 |
| 2,818,191 | 12/1957 | Arne | 220—1 |
| 2,860,806 | 11/1958 | Yanowitz | 220—1 |
| 3,314,567 | 4/1967 | Becker et al. | 220—5 |
| 3,414,153 | 12/1968 | Leroux | 220—1 |

JOSEPH R. LECLAIR, Primary Examiner

J. R. GARRETT, Assistant Examiner

U.S. Cl. X.R.

220—5, 71, 83